(12) United States Patent
Philipp et al.

(10) Patent No.: US 7,007,547 B2
(45) Date of Patent: Mar. 7, 2006

(54) OPTICAL SENSOR OR EMITTER USED FOR MONITORING COMBUSTION PROCESSES

(75) Inventors: Harald Philipp, Wegersfeld (AT); Ernst Winklhofer, St. Johann Ob Hohenburg (AT)

(73) Assignee: AVL List GmbH, Graz (AT)

( * ) Notice: Subject to any disclaimer, the term of this patent is extended or adjusted under 35 U.S.C. 154(b) by 29 days.

(21) Appl. No.: 10/095,464

(22) Filed: Mar. 13, 2002

(65) Prior Publication Data
US 2002/0134138 A1 Sep. 26, 2002

(30) Foreign Application Priority Data
Mar. 22, 2001 (AT) .............................. GM212/2001

(51) Int. Cl.
*G01L 23/22* (2006.01)
(52) U.S. Cl. ........................................ 73/116; 73/35.07
(58) Field of Classification Search ............... 73/35.01, 73/35.07, 119 A, 116; 385/119
See application file for complete search history.

(56) References Cited

U.S. PATENT DOCUMENTS

| | | | |
|---|---|---|---|
| 4,409,815 A * | 10/1983 | Burkel et al. ............... | 73/35.07 |
| 4,422,321 A | 12/1983 | Muller et al. ............... | 73/35.01 |
| 4,425,788 A * | 1/1984 | Franke et al. ............... | 73/35.01 |
| 4,446,723 A | 5/1984 | Böning et al. ................ | 374/14 |
| 4,887,574 A * | 12/1989 | Kuroiwa et al. ........ | 123/406.27 |
| 4,918,982 A * | 4/1990 | Pischinger et al. ........... | 73/116 |
| 5,271,265 A | 12/1993 | Pischinger et al. ........ | 73/35.04 |
| 5,659,132 A * | 8/1997 | Novak et al. ................. | 73/115 |
| 6,490,931 B1 * | 12/2002 | Fernald et al. ................ | 73/705 |

FOREIGN PATENT DOCUMENTS

| | | |
|---|---|---|
| AT | 002 910 U1 | 6/1999 |
| DE | 196 00 258 A1 | 7/1996 |
| DE | 196 27 862 C1 | 1/1998 |
| EP | 0 313 884 A2 | 5/1989 |
| EP | 0 593 413 B1 | 4/1996 |

* cited by examiner

*Primary Examiner*—Helen Kwok
(74) *Attorney, Agent, or Firm*—Dykema Gossett PLLC

(57) ABSTRACT

An optical sensor or emitter (1) used for monitoring combustion processes in a combustion chamber is provided with an optical element (2) on a side facing the combustion chamber and an optical fiber or fiber bundle (3) on a side opposite the combustion chamber, the optical element and optical fiber/fiber bundle being jointly held in a metal sleeve (4). An annular gap filled with solder material (5) is provided between the optical element (2) and the inside of the metal sleeve (4).

9 Claims, 3 Drawing Sheets

OPTICAL SENSOR OR EMITTER USED FOR MONITORING COMBUSTION PROCESSES

BACKGROUND OF THE INVENTION

The invention relates to an optical sensor or emitter used for monitoring combustion processes in a combustion chamber, preferably during operation of an internal combustion engine, which is provided with an optical element on the side facing the combustion chamber and an optical fiber or fiber bundle on the side opposite of the combustion chamber, which are jointly held in a metal sleeve, and to a process for manufacturing such optical sensors.

DESCRIPTION OF PRIOR ART

The above sensors are employed in the field of engine development, for example, to study the temporal and spatial development of combustion processes. In EP 0 593 413 B1, for instance, an optoelectronic measuring device is disclosed in which the sensors are located in the cylinder head gasket of an internal combustion engine. The individual optical sensors, which may be combined into groups, each have a spherical lens of quartz or sapphire which is in contact with an optical fiberguide. Spherical lens and optical fiber are positioned in the bore of a metal bracket, within a given distance of each other, the size of the aperture of the bore, the diameter of the optical fiber, and the distance between optical fiber and spherical lens defining the imaging characteristics of the optical sensor. Due to the small overall height of about 2 mm, which must conform to the thickness of the respective cylinder head gasket, the manufacture of such sensors is complicated and expensive, above all in view of the sizes required to ensure imaging standards.

Another optical device of this kind is described in AT 002 910 U1, where the optical sensor does not have a spherical lens but a plano-convex rod-shaped lens of quartz or sapphire, whose convex face is directed towards the combustion chamber and whose plane face serves as focal plane of the lens in addition to being used as contact face for the optical fiber or fiber bundle. With this arrangement no distance need be kept between lens and optical fiberguide, and the optical fiber may be moved up close to the rod-shaped lens during assembly. Rod-shaped lens and optical fiber or fiber bundle are thus combined and held in a common sensor sleeve where they are sealed in place by means of an adhesive, preferably an epoxy adhesive or glass ceramic.

EP 0 313 884 A2 is concerned with a method and device for recognizing and evaluating knocking combustion during operation of an internal combustion engine, using an optical sensor with a plano-convex lens or viewing window next to the combustion chamber, the window being embedded in insulating material for the purpose of heat insulation.

In U.S. Pat. No. 4,422,321 A an optical sensor is disclosed which is suitable for monitoring combustion processes and has a cylindrical lens element of quartz glass on the side of the combustion chamber. The entire arrangement is located in a threaded housing, the lens element being laterally held in position by spacer rings in a bore of the housing and fitted against a sealing ring of the housing on the side of the combustion chamber. On the side turned away from the combustion chamber a bundle of optical fibers is guided up to the quartz element and pressed against it by a flange of housing. According to a variant of the invention the ring-shaped gap between quartz element and housing may be filled with talcum qr graphite powder. The disadvantage of this variant is its complex manufacturing process, which can hardly be adapted for use with small-size sensor elements, so that such sensor arrays are not suitable for use with cylinder head gaskets or correspondingly modified spark plugs or injectors.

An optical sensor of similar design, which is integrated into the piston top of an internal combustion engine and is provided with a rod of sapphire or quartz glass held in a metal sleeve and serving as a window into the combustion chamber, is disclosed in U.S. Pat. No. 4,918,982 A.

SUMMARY OF THE INVENTION

It is the object of the present invention to propose an optical sensor for monitoring combustion processes in a combustion chamber, or an optical emitter for introducing measuring radiation into a combustion chamber, which will permit a simple manufacturing process even in the instance of very small dimensions, such as exterior diameters of not more than 2.5 mm, and will be able to withstand the large pressure and temperature variations in combustion chambers.

This object is achieved by providing an annular gap filled with solder between the optical element and the inside of the metal sleeve. This way of fastening the optical element, e.g., a condensing or dispersing lens, will have its advantages compared to attaching it by means of an epoxy adhesive or glass ceramic, since the bond is more elastic and temperature-stable.

According to the invention a sensor or emitter of the above type is produced as follows:
  a) Manufacturing a metal sleeve of an inner diameter that is slightly larger than the outer diameter of the optical element, the outer diameter of the metal sleeve having an oversize;
  b) Inserting the optical element into the metal sleeve, this element forming an annular gap relative to the metal sleeve and projecting beyond the latter preferably with its front end;
  c) Introducing solder material into the annular gap between the optical element and the metal sleeve;
  d) Machining the metal sleeve to size until its final dimension is reached, and removing excess solder;
  e) Fastening the optical fiber or fiber bundle inside the metal sleeve.

Optical elements projecting beyond the metal sleeve to a given extent, for instance convex condenser lenses, present hot, self-cleaning surfaces.

Special advantages in monitoring combustion processes of an internal combustion engine during operation may be obtained by configuring the optical element as a plano-convex or plano-concave rod-shaped lens which is made of sapphire and soldered into a steel sleeve by means of a ceramic-metal mix. As no adhesive bonds are required on the side of the combustion chamber the service life of such sensors may be considerably increased.

According to a variant of the invention the optical element may be provided on its front end facing the combustion chamber with deflection surfaces deflecting the optical radiation path in predefined spatial directions. Such variants are well suited for integration into spark plugs, glow plugs or injectors.

In accordance with the invention the metal sleeve may be provided with at least one lateral bore or lateral slit in the area of the optical element, into which the solder material can be introduced. The manufacturing process proposed by the invention will permit optical sensors and emitters to be produced, where the outer diameter of the metal sleeve is <5 mm, and preferably <2 mm, and the inner diameter <4 mm, and preferably <1.6 mm.

BRIEF DESCRIPTION OF THE DRAWINGS

The invention will now be explained in more detail, with reference to the attached drawings, wherein.

DETAILED DESCRIPTION OF PREFERRED EMBODIMENTS

Figure 1:
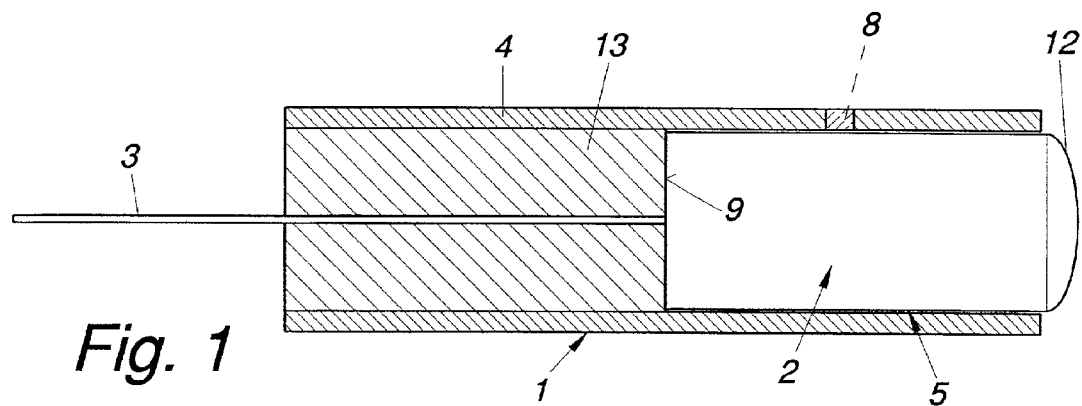
FIG. 1 shows a first variant of an optical sensor or emitter proposed by the invention, in longitudinal section.

The exemplary optical sensor 1 of FIG. 1 serves for the monitoring of combustion processes in a combustion chamber and is provided with a condenser lens as an optical element 2 on the side facing the combustion chamber, and an optical fiber or fiber bundle 3 on the opposite side. In the same manner the device may be used as an emitter for the purpose of introducing measuring or excitation radiation into the combustion chamber of an internal combustion engine.

The condenser lens and the optical fiber bundle 3 (for example, a row of fibers located in a plane normal to the drawing plane) are jointly positioned in a tubular metal sleeve 4. Between the cylindrical optical element 2 and the inside of the metal sleeve 4 an annular gap is provided which is filled with solder material 5 (the cylindrical optical element 2 is coaxial with a longitudinal central axis of the metal sleeve 4). The optical element 2 made of sapphire is configured as a piano-convex rod-shaped lens and soldered in place in the steel sleeve 4 (e.g., FeNi42) by means of a ceramic-metal mix.

Figure 2:
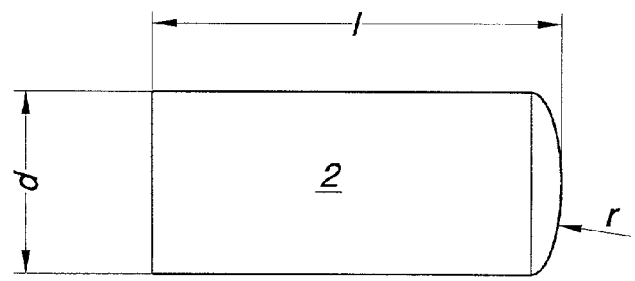
FIGS. 2 to 4 show diverse steps of the manufacturing process of the sensor or emitter, again in longitudinal section.
Figure 3:
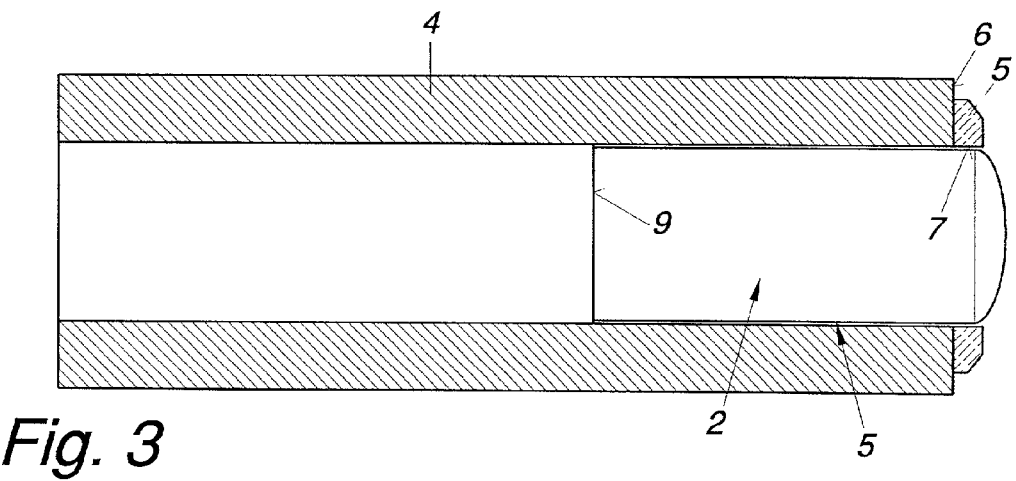
Figure 4:
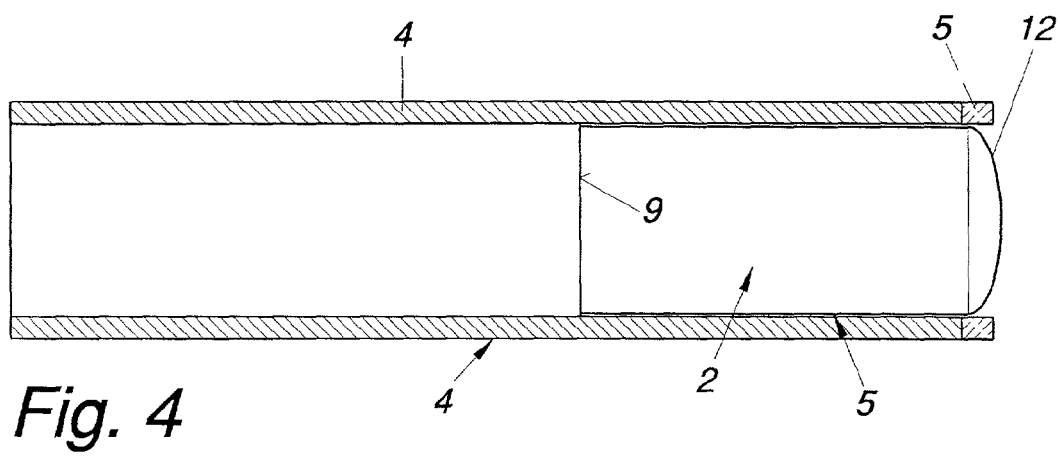

In FIGS. 2 to 4 the manufacturing of an optical sensor according to the invention is shown step by step, the numbers referring only to a preferred variant (sensor placed in a cylinder head gasket), which should not be understood as a restriction.

A plano-convex rod-shaped lens as shown in FIG. 2, with a diameter d of 1.5 mm, a length l of about 6 mm and a curvature radius r of the convex face of about 2.5 mm, is inserted into a previously prepared metal sleeve of a length of about 10 mm according to FIG. 3, the inner diameter of the metal sleeve being slightly larger than the outer diameter of the rod-shaped lens. In the example shown the inner diameter is 1.56±0.03 mm, for instance. Compared to the finished sensor the outer diameter of the metal sleeve 4 is oversized. In a further step solder material 5 is introduced into the annual gap between rod-shaped lens and metal sleeve 4, two variants being conceivable. For example, the solder material 5—as shown in FIG. 3—may be introduced into a groove formed by the front end 6 of the metal sleeve 4 and the sidewall 7 of the condenser lens projecting beyond the metal sleeve 4. The capillary effect will induce the solder material to flow into the annular gap between metal sleeve and condenser lens. It should be noted in this context that the front end 12 of the optical element configured as a convex surface should be kept clear of the solder material.

In a second variant the solder material 5 may enter the annular gap between optical element 2 and metal sleeve 4 via one or more lateral bores 8 (see FIG. 1). Instead of the lateral bore 8 a slit may be cut into the metal sleeve 4.

In a further processing step the metal sleeve 4 is cut to its final size (for example, 1.8 mm) and excess solder 5 is removed (see FIG. 4). The optical fiber or fiber bundle 3 is anchored in the metal sleeve 4, by moving it up to the plane rear end 9 of the optical element 2 and attaching it there. The ends of the row of fibers or fiber bundle 3 may be held by a cylindrical metal bracket 13, which is fastened to the metal sleeve 4 by mechanical means (see FIG. 5). At the colder end of the metal sleeve 4 opposite of the combustion chamber, the bracket 13 could also be attached by an adhesive.

Figure 5:
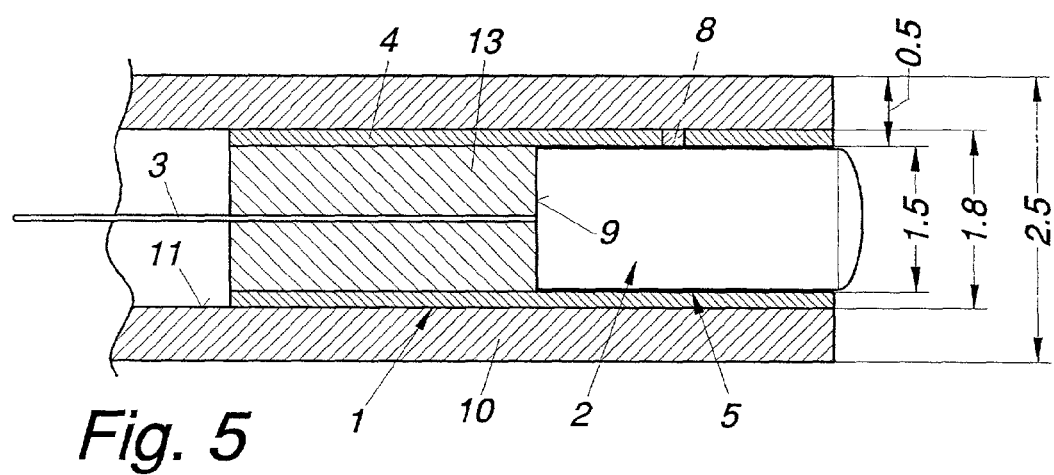
FIG. 5 shows the sensor or emitter integrated into a cylinder head gasket.

In FIG. 5 the optical sensor or emitter 1 is shown in its measuring position in a cylinder head gasket 10. Attaching the sensor in bore 11 may be effected by soft-soldering, for example, thereby ensuring that no adhesive is required for the entire optical arrangement, at least on the side of the combustion chamber.

Figure 6:
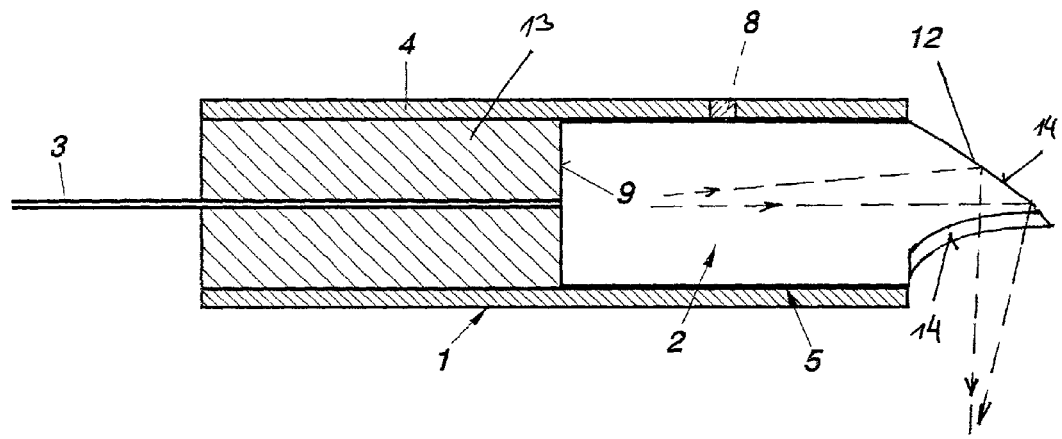
FIGS. 6 and 7 show two further variants of an optical sensor or emitter according to the invention.

According to the variant shown in FIG. 6 the optical element 2 may be provided with deflecting surfaces 14 at its front end 12, which will redirect the measuring and excitation radiation into the desired spatial direction, or image a predefined spatial area. Such optical elements may also be soldered into suitably adapted spark plugs, glow plugs or injectors, or inserted into measuring bores in the walls of the combustion chamber.

It would further be possible to facilitate introduction of the solder material 5 into the annular gap between optical element 2 and metal sleeve 4 by providing the metal sleeve with a beaded rim before insertion of the optical element, and removing the bead after the solder material has been put in place.

Figure 7:
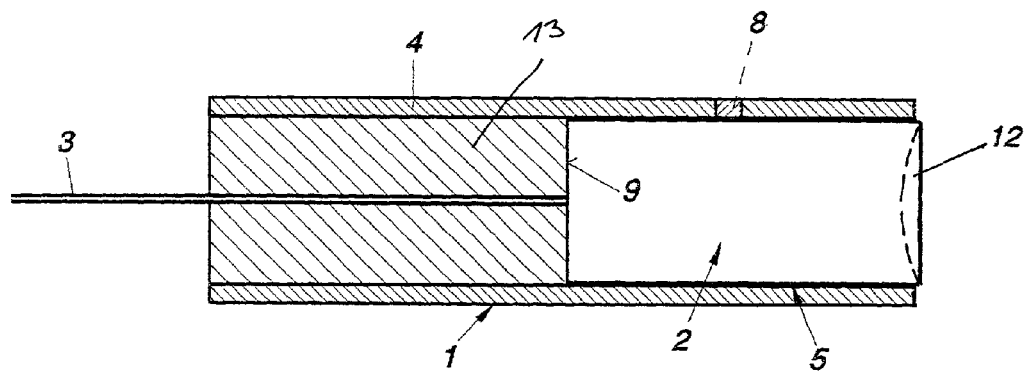

According to the variant shown in FIG. 7 the optical element 2 may have a plane front face 12 and thus serve as an optical window, or it may be configured as a plano-concave rod-shaped lens, as indicated by the broken line.

What is claimed is:

1. An optical sensor or emitter for monitoring combustion processes in a combustion chamber, consisting of a tubular metal sleeve which defines a longitudinal central axis; an optical element located within said metal sleeve so as to be coaxial therewith, said optical element having opposite front and rear ends and a side surface, an annular gap being formed between said side surface and an inner surface of said metal sleeve; a cylindrical metal bracket containing at least one optical fiber fixedly positioned within said metal sleeve adjacent said rear end of said optical element so as to fixedly abut said optical fiber against said rear end of said optical element; and a solder material located within said annular gap to fixedly position said optical element in said metal sleeve.

2. Optical sensor or emitter according to claim 1, wherein said metal bracket contains an optical fiber bundle.

3. Optical sensor or emitter according to claim 1, wherein said optical element is configured as a plano-convex or plano-concave rod-shaped lens which is made of sapphire and soldered into a said sleeve made of steel by means of a ceramic-metal mix.

4. Optical sensor or emitter according to claim 1, wherein a front end of said optical element facing said combustion chamber is provided with deflection surfaces deflecting optical radiation path in predefined spatial directions.

5. Optical sensor or emitter according to claim 1, wherein said metal sleeve is provided with at least one lateral bore in register with said optical element therein for the supply of said solder material to said annular gap.

6. Optical sensor or emitter according to claim 1, wherein said metal sleeve is provided with at least one lateral slit in register with said optical element therein for the supply of said solder material said annular gap.

7. Optical sensor or emitter according to claim 1, wherein an outer diameter of said metal sleeve is <5 mm and an inner diameter of said metal sleeve is <4 mm.

8. Optical sensor or emitter according to claim 1, wherein an outer diameter of said metal sleeve is <2 mm, and an inner diameter of said metal sleeve is <1.6 mm.

9. Optical sensor or emitter according to claim 1, used for monitoring combustion processes in a combustion chamber during operation of an internal combustion engine.

\* \* \* \* \*